Feb. 6, 1940. E. A. GLYNN 2,189,203
TIRE BUFFER
Filed March 15, 1938
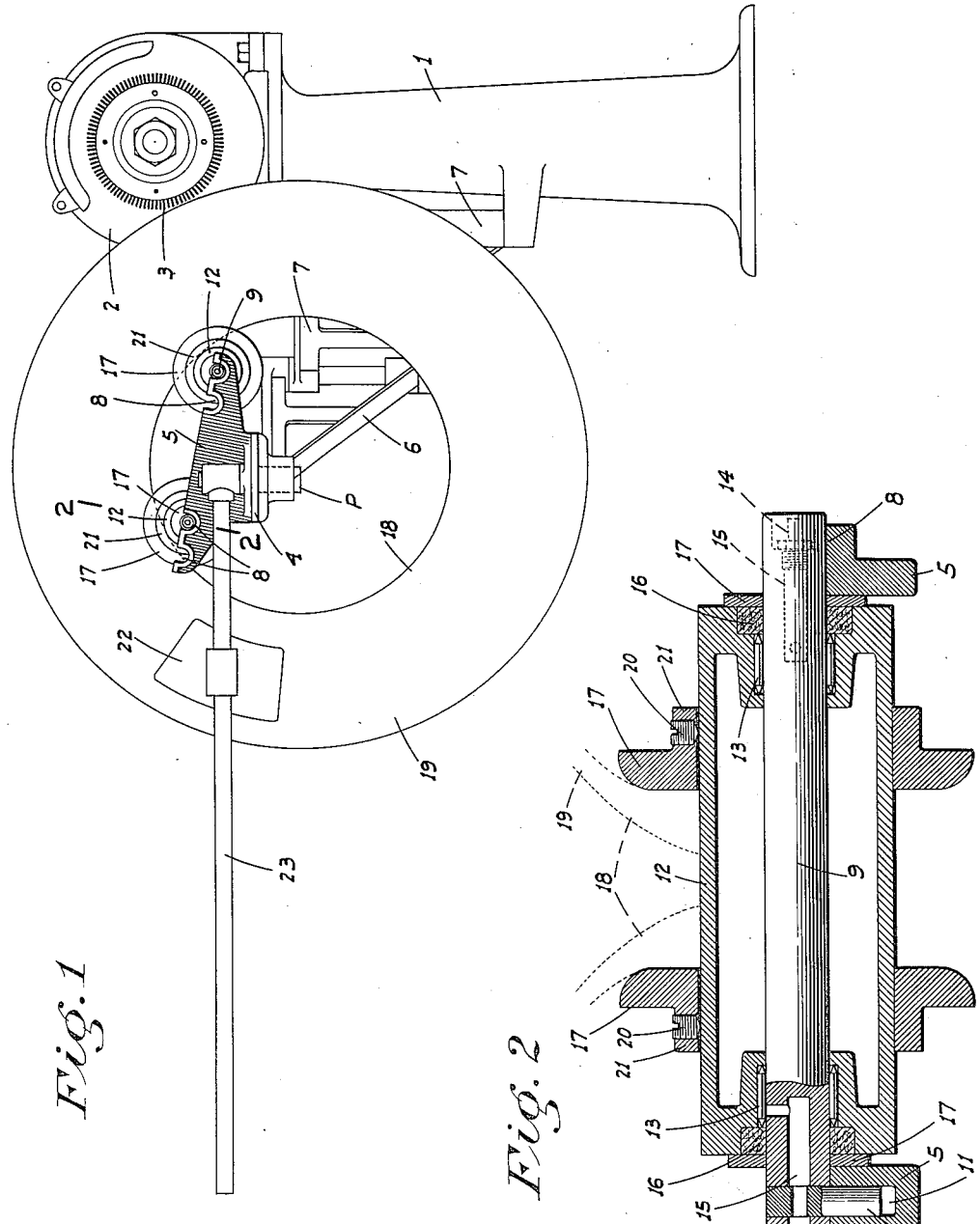
INVENTOR
*E. A. Glynn*
BY (signature)
ATTORNEY Patented Feb. 6, 1940

2,189,203

UNITED STATES PATENT OFFICE 2,189,203

TIRE BUFFER

Edwin A. Glynn, Lodi, Calif., assignor to Super Mold Corporation of California, Lodi, Calif., a corporation of California Application March 15, 1938, Serial No. 195,989

2 Claims. (Cl. 51—236)

This invention relates to a tire buffing machine and particularly to the tire supporting carrier of a machine such as that shown in Patent No. 1,848,684, granted March 8, 1932, to H. J. Woock.

Such a carrier includes flanged bead engaging rollers, and the principal object of my invention is to adjustably mount these rollers so as to enable tires of various rim diameters to be properly supported in cooperating relationship with the rotary buffing elements, and to separately adjust the flanges so as to properly retain the beads of tires of different cross sectional diameters.

By reason of the above features of construction, the manipulation of the tires during the buffing thereof is greatly facilitated and buffing operations are speeded up and greater efficiency obtained with a minimum of physical effort on the part of the operator in maintaining a tire in place on the carrier.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a side outline of a buffing machine showing my improved tire carrier.

Figure 2 is an enlarged cross section on line 2—2 of Fig. 1.

Referring now more particularly to the characters of reference on the drawing, the buffing machine comprises a pedestal 1 on which is mounted an electric motor 2. This is directly connected to the tire buffing devices which include a rotary rasp 3.

The tire carrier, which is the subject matter of this invention, includes a box 4 having upstanding side walls 5. The box is supported for swivel movement in a horizontal plane about a vertical pivot pin P on a swing arm or bracket 6 which in turn is hinged for similar movement on a main bracket 7, the bracket 7 being hinged on the pedestal 1.

The bracket and carrier arrangement and mounting as a whole are all standard in the buffing machine of the patent referred to.

The side walls 5 of the carrier box are formed with rows of transversely alined open topped cradles 8, of semicircular form at the bottom and preferably disposed in pairs spaced widely along the length of said walls. Each opposed pair of cradles is adapted to receive and support a spindle 9 which is held against axial and rotary movement by a radial pin 10 secured thereon adjacent one end and removably engaging a socket 11 depending from the bottom of an adjacent cradle. Only a pair of spindles is used at any one time.

Disposed about each spindle is a smooth faced roller 12, journaled in connection with the spindle for free rotation by antifriction bearings 13. These are placed near the ends of the roller and are lubricated when necessary from pressure fittings 14 mounted in the ends of the spindle and communicating with passages 15 in the spindle which lead to the bearing areas. Sealing gaskets 16 are fitted in the ends of the roller and prevent escape of the lubricant, washers 17 between the ends of the rollers and adjacent side walls 5 retaining the gaskets and also holding the rollers against axial movement.

Mounted on each roller for adjustment along the same are flanges 17 to engage the outer sides of the bead portions 18 of a tire 19 being buffed. The flanges are held in any desired spaced relation, depending on the transverse size of the tire, by set screws 20 mounted in the hubs 21 of the flanges (which hubs project away from each other) and biting into the roller.

In operation, the tire is mounted on the carrier as usual, its inner periphery at the top resting at spaced points on the spaced rollers, so that the tire is then disposed in a vertical plane parallel to the lengthwise dimension of the carrier box and its side walls. The tire is then of course in position to engage and be acted on by the buffing rasp 3 or other element, upon proper manipulation of the swinging brackets and carrier.

Due to the possible adjustment of the two rollers relative to each other along the carrier, tires of different rim diameters may be supported for greater ease of rotation and manipulation than when the rollers are at fixed distances apart, as has previously been the case. Also, due to the independent adjustment of which the bead engaging flanges are capable, the beads of different tires may be better held in the best positions for proper and efficient buffing of the tire.

In connection with the above structure, I preferably use brakeshoes 22 to engage the tire on opposite sides and at points further from the machine than either roller.

These shoes are mounted on horizontal arms 23 pivoted on the sides of the carrier, and while in themselves these brakeshoes form no part of my invention, they provide, with the rollers spaced circumferentially of the tire, what is in effect a three point mounting of the tire which greatly facilitates the manipulation of the tire.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a tire buffing machine, a tire carrier comprising a box having upstanding spaced side walls, a pair of tire supporting rollers adapted to fit between the side walls, spindles on which the rollers are turnably mounted projecting beyond the ends of the rollers to overhang the side walls, a plurality of cradles depressed in the side walls from and open to the top thereof in spaced and transversely alined relation to selectively and removably receive the end portions of the spindles from above and means between each spindle at one end thereof and a cooperating cradle to hold the spindle against axial and rotative movement when the spindle is inserted into position in the cradles from above.

2. In a tire buffing machine, a tire carrier comprising a box having upstanding spaced side walls, a pair of tire supporting rollers adapted to fit between said side walls, spindles on which the rollers are turnably mounted projecting beyond the ends of the rollers to overhang the side walls, pairs of cradles depressed in the side walls in spaced and transversely alined relation along the top thereof to selectively and removably receive the end portions of the spindles, a pin fixed on one end portion of each spindle and extending radially therefrom and a socket depending from the bottom of one cradle of each pair to receive the pin.

EDWIN A. GLYNN.